United States Patent
Adkisson

(10) Patent No.: US 7,219,251 B2
(45) Date of Patent: *May 15, 2007

(54) PROGRAMMABLE CLOCK SYNCHRONIZER

(75) Inventor: Richard W. Adkisson, Dallas, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 782 days.

This patent is subject to a terminal disclaimer.

(21) Appl. No.: 10/630,159

(22) Filed: Jul. 30, 2003

(65) Prior Publication Data

US 2004/0223564 A1 Nov. 11, 2004

Related U.S. Application Data

(60) Provisional application No. 60/469,120, filed on May 9, 2003.

(51) Int. Cl.
  G06F 13/42 (2006.01)
  G06F 5/06 (2006.01)
  H04L 7/04 (2006.01)
(52) U.S. Cl. .............. 713/400; 713/401; 713/500; 713/600; 713/601
(58) Field of Classification Search .............. None
  See application file for complete search history.

(56) References Cited

U.S. PATENT DOCUMENTS

| | | | | |
|---|---|---|---|---|
| 5,256,912 A * | 10/1993 | Rios | .......................... | 327/144 |
| 5,347,559 A | 9/1994 | Hawkins et al. | | |
| 5,434,996 A * | 7/1995 | Bell | .......................... | 713/400 |
| 5,721,886 A | 2/1998 | Miller | | |
| 5,884,100 A * | 3/1999 | Normoyle et al. | .......... | 713/400 |
| 6,075,832 A | 6/2000 | Geannopoulos et al. | | |
| 6,084,934 A | 7/2000 | Garcia et al. | | |
| 6,114,915 A | 9/2000 | Huang et al. | | |
| 6,134,155 A | 10/2000 | Wen | | |
| 6,175,603 B1 | 1/2001 | Chapman et al. | | |
| 6,246,275 B1 | 6/2001 | Wodnicki et al. | | |
| 6,249,875 B1 * | 6/2001 | Warren | ........................ | 713/400 |
| 6,326,824 B1 | 12/2001 | Hosoe et al. | | |
| 6,369,624 B1 | 4/2002 | Wang et al. | | |
| 6,516,362 B1 * | 2/2003 | Magro et al. | ................ | 713/400 |
| 6,529,083 B2 | 3/2003 | Fujita | | |
| 6,633,994 B1 * | 10/2003 | Hofmann et al. | ............ | 713/600 |
| 2002/0051509 A1 | 5/2002 | Lindner et al. | | |

(Continued)

OTHER PUBLICATIONS

Search Report under Section 17 in GB0409008.0 from the UK Patent Office (date of search Aug. 19, 2004), 1 page.

Primary Examiner—James K. Trujillo

(57) ABSTRACT

A programmable synchronizer system for effectuating data transfer across a clock boundary between a core clock domain and a bus clock domain, wherein the core clock domain is operable with a core clock signal and the bus clock domain is operable with a bus clock signal, the core and bus clock signals having a ratio of N core clock cycles to M bus clock cycles, where N/M≧1. A first synchronizer is provided for synchronizing data transfer from a core clock domain logic block to a bus clock domain logic block. A second synchronizer is operable to synchronize data transfer from the bus clock domain logic block to the core clock domain logic block. Control means are included for controlling the first and second synchronizers, the control means operating responsive at least in part to configuration means that is configurable based on skew tolerance and latency parameters.

33 Claims, 7 Drawing Sheets

U.S. PATENT DOCUMENTS

2002/0158671 A1  10/2002  Wang et al.
2002/0196886 A1  12/2002  Adkisson
2002/0199124 A1  12/2002  Adkisson

* cited by examiner

PROGRAMMABLE CLOCK SYNCHRONIZER

PRIORITY UNDER 35 U.S.C. §119(e) & 37 C.F.R. §1.78

This nonprovisional application claims priority based upon the following prior U.S. provisional patent application entitled: "Programmable Clock Synchronizer and Controller Arrangement Therefor," application Ser. No.: 60/469,120, filed May 9, 2003, in the name(s) of: Richard W. Adkisson, which is hereby incorporated by reference.

CROSS-REFERENCE TO RELATED APPLICATION(S)

This application discloses subject matter related to the subject matter disclosed in the following commonly owned patent applications: following commonly owned patent applications: (i) "Controller Arrangement for a Programmable Clock Synchronizer," filed Jul. 30, 2003; application Ser. No. 10/630,182 (now issued as U.S. Pat. No. 7,100,065), in the name(s) of: Richard W. Adkisson; (ii) "System and Method for Synchronizing Multiple Synchronizer Controllers," filed Jul. 30, 2003; application Ser. No. 10/629,989 (now issued as U.S. Pat. No. 7,194,650), in the name(s) of: Richard W. Adkisson; (iii) "System and Method for Maintaining a Stable Synchronization State in a Programmable Clock Synchronizer," filed Jul. 30, 2003; application Ser. No. 10/630,297, in the name(s) of: Richard W. Adkisson; (iv) "System and Method for Compensating for Skew between a First Clock Signal and a Second Clock Signal," filed Jul. 30, 2003; application Ser. No. 10/630,317, in the name(s) of: Richard W. Adkisson; and (v) "Phase Detector for a Programmable Clock Synchronizer," filed Jul. 30, 2003; application Ser. No. 10/630,298 (now issued as U.S. Pat. No. 6,864,722), in the name(s) of: Richard W. Adkisson, all of which are incorporated by reference herein.

BACKGROUND

Digital electronic systems, e.g., computer systems, often need to communicate using different interfaces, each running at an optimized speed for increased performance. Typically, multiple clock signals having different frequencies are utilized for providing appropriate timing to the interfaces. Further, the frequencies of such clock signals are generally related to one another in a predetermined manner. For example, a core or system clock running at a particular frequency ($F_c$) may be utilized as a master clock in a typical computer system for providing a time base with respect to a specific portion of its digital circuitry. Other portions of the computer system's digital circuitry (such as a bus segment and the logic circuitry disposed thereon) may be clocked using timing signals derived from the master clock wherein the derived frequencies ($F_D$) follow the relationship: $F_c/F_D \geq 1$.

Because of the asynchronous—although related—nature of the constituent digital circuit portions, synchronizer circuitry is often used in computer systems to synchronize data transfer operations across a clock domain boundary so as to avoid timing-related data-errors. Such synchronizer circuitry is typically required to possess low latency (which necessitates precise control of the asynchronous clocks that respectively clock the circuit portions in two different clock domains). Furthermore, since phase-locked loops (PLLs) utilized in conventional arrangements to produce clocks of different yet related frequencies can have a large amount of input/output (I/O) jitter; it is essential that the synchronizer circuitry be able to tolerate significant amounts of low frequency phase difference (or, skew) between the clocks generated thereby.

SUMMARY

A programmable synchronizer system is provided for effectuating data transfer across a clock boundary between a core clock domain and a bus clock domain, wherein the core clock domain is operable with a core clock signal and the bus clock domain is operable with a bus clock signal, the core and bus clock signals having a ratio of N core clock cycles to M bus clock cycles, where $N/M \geq 1$. A first synchronizer is provided for synchronizing data transfer from a core clock domain logic block to a bus clock domain logic block. A second synchronizer is operable to synchronize data transfer from the bus clock domain logic block to the core clock domain logic block. Control means are included for controlling the first and second synchronizers, the control means operating responsive at least in part to configuration means that is configurable based on skew tolerance and latency parameters.

DETAILED DESCRIPTION OF THE DRAWINGS

Figure 1:
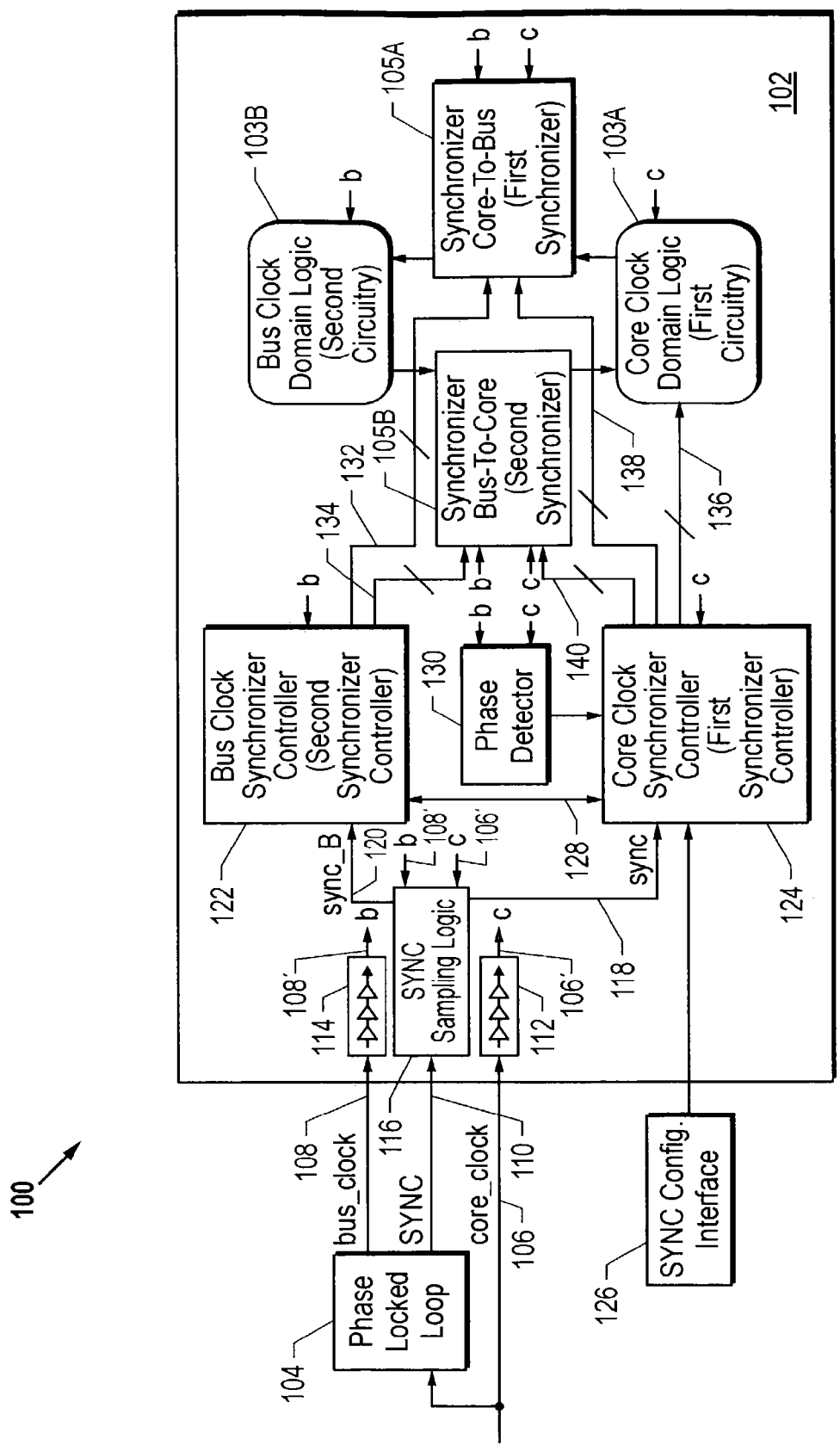
FIG. 1 depicts a block diagram of an embodiment of a programmable synchronizer system for effectuating data transfer across a clock boundary.

In the drawings, like or similar elements are designated with identical reference numerals throughout the several views thereof, and the various elements depicted are not necessarily drawn to scale. Referring now to FIG. 1, therein is depicted an embodiment of a programmable synchronizer system 100 for effectuating data transfer across a clock boundary between a first clock domain (i.e., "fast clock domain") having N clock cycles and a second clock domain (e.g., "slow clock domain") having M clock cycles such that N/M>1. Typically, M=(N−1), and by way of exemplary implementation, the synchronizer system 100 may be provided as part of a computer system for transferring data between a faster core clock domain (e.g., operating with a core clock signal of 250 MHz) and a slower bus clock domain (e.g., operating with a bus clock signal of 200 MHz), with a 5:4 frequency ratio. Accordingly, for purposes of this present patent application, the terms "first clock" and "core clock" will be used synonymously with respect to a fast clock domain; likewise, the terms "second clock" and "bus clock" will be used with respect to a slow clock domain.

A phase-locked loop (PLL) circuit 104 is operable to generate a SYNC pulse 110 and a bus clock (i.e., second clock) signal 108 (designated as bus_clock) based on a core clock (i.e., first clock) signal 106 (designated as core_clock) provided thereto. As will be seen below, the SYNC pulse 110 provides a reference point for coordinating data transfer operations and is driven HIGH when the bus_clock and core_clock signals have coincident rising edges. The two clock signals 106, 108 and SYNC pulse 110 are provided to a synchronizer/controller block 102 that straddles the clock boundary between a first clock domain (i.e., core clock domain) and a second clock domain (i.e., bus clock domain) for effectuating data transfer across the boundary. Reference numerals 103A and 103B refer to circuitry disposed in the first and second clock domains, respectively, e.g., core clock domain logic and bus clock domain logic, that transmit and receive data therebetween as facilitated via synchronizers 105A and 105B, which will be described in greater detail hereinbelow.

Each of the core_clock and bus_clock signals 106, 108 is first provided to a respective clock distribution tree block for generating a distributed clock signal that is provided to various parts of the synchronizer/controller block 102. Reference numeral 112 refers to the clock distribution tree operable with the core_clock signal 106 to generate the distributed core_clock signal, which is labeled as "c" and shown with reference numeral 106' in FIG. 1. Likewise, reference numeral 114 refers to the clock distribution tree 114 operable with the bus_clock signal 108 to generate the distributed bus_clock signal, which is labeled as "b" and shown with reference numeral 108' in FIG. 1. As one skilled in the art should readily recognize, the distributed clock signals are essentially the same as the input clock signals. Accordingly, the core_clock signal 106 and its distributed counterpart c 106' are treated equivalently hereinafter. Also, the bus_clock signal 108 and its distributed counterpart b 108' are similarly treated as equivalent.

A SYNC sampling logic block 116 is operable responsive to the distributed clock signals 106', 108' and SYNC pulse signal 110, to generate a pair of sampled SYNC pulses that are forwarded to appropriate synchronizer controller circuitry. In one embodiment, the sampled SYNC pulses are manufactured as follows. The SYNC pulse 110 is sampled twice by two flip flop (FF) elements (not shown in FIG. 1) that are clocked on the rising edge of the distributed core_clock, c 106'. As may be appreciated, sampling by two FF elements is effective in eliminating metastability associated with the SYNC pulse 110 (possibly arising due to the skew between the input signal, core_clock 106 and the output signal, SYNC 110). The twice-sampled SYNC pulse is designated as "sync" signal 118 in FIG. 1, which is provided to a first synchronizer controller (or, core clock synchronizer controller) 124 operating in the first clock domain.

With respect to the second clock domain (i.e., bus clock domain), the SYNC pulse 110 is sampled in the SYNC sampling logic block 116 by a single FF element (not shown in this FIG.) that is clocked on the rising edge of the distributed bus_clock, b 108'. To signify that the sampling is done using the bus_clock, the sampled SYNC pulse is designated as "sync_B" signal 120, which is provided to a second synchronizer controller 122 operating in the second clock domain, also referred to as the bus clock synchronizer controller in FIG. 1.

The bus clock synchronizer controller 122 is operable responsive to the distributed bus_clock, b 108' and sampled sync_B pulse 120 to generate a plurality of synchronizer control signals, a portion of which signals are directed to a first synchronizer circuit means 105A operating to control data transfer from first circuitry 103A (i.e., core clock domain logic) to second circuitry 103B (i.e., bus clock domain logic). Reference numeral 132 refers to the signal path of this portion of control signals emanating from the bus clock synchronizer controller 122. Another portion of the synchronizer control signals generated by the bus clock synchronizer controller 122 are directed (via signal path 134) to a second synchronizer circuit means 105B operating to control data transfer from second circuitry 103B to first circuitry 103A. Consistent with the nomenclature used in the present patent application, the first and second synchronizer circuits may also be referred to as core-to-bus synchronizer and bus-to-core synchronizer circuits, respectively. In addition, the bus clock synchronizer controller 122 also generates a set of inter-controller control signals that are provided to the first synchronizer controller 124 (i.e., core clock synchronizer controller) such that both controllers can work together. Reference numeral 128 refers to the signal path of the inter-controller clock relationship control signal(s) provided to the core clock synchronizer controller 124.

Similar to the operation of the bus clock synchronizer controller 122, the core clock synchronizer controller 124 is operable responsive to the distributed core_clock, c 106', inter-controller control signals and sampled sync pulse 118 to generate a plurality of synchronizer control signals, a portion of which signals are directed to the first synchronizer circuit means 105A and another portion of which signals are directed to the second synchronizer circuit means 105B. Reference numerals 138 and 140 refer to the respective signal paths relating to these control signals. The core clock synchronizer controller 124 also generates data transmit/ receive control signals that are provided to the core clock domain logic 103A via signal path 136 in order that the core clock domain logic 103A knows when it can send data to the bus clock domain logic 103B (i.e., valid TX operations) and when it can receive data from the bus clock domain logic 103B (i.e., valid RX operations).

All control signals from the bus clock synchronizer controller 122 to the first and second synchronizers 105A, 105B are staged through one or more FF elements that are clocked with the distributed bus_clock, b 108'. Likewise, the control signals from the core clock synchronizer controller 124 are staged through a number of FF elements clocked with the distributed core_clock, c 106', before being provided to the various parts of the synchronizer system 100. Accordingly, as will be seen in greater detail below, the various control signals associated with the synchronizer system 100 may be designated with a signal label that is concatenated with a "_ff" or "_ff_B" suffix to indicate the registration process by the distributed core_clock or the distributed bus_clock.

A phase detector 130 detects phase differences (i.e., skew) between the two clock signals by operating responsive to the sampled bus_clock and core_clock signals. This information is provided to the core clock synchronizer controller 124, which can compensate for the skew or determine appropriate times to coordinate with the bus clock synchronizer controller 122.

Where the bus_clock signal is stable with respect to the SYNC pulse, the inter-controller clock relationship control signals are generated by the bus clock synchronizer controller 122 that provide information as to the frequency ratio of the first and second clock signals, clock sequence information and SYNC delay, which are transmitted to the core clock synchronizer controller 124 for synchronizing its core_clock signal in accordance therewith. On the other hand, where the core_clock signal is stable with respect to the SYNC pulse, the inter-controller clock relationship control signals are generated by the core clock synchronizer controller 124 for transmission to the bus clock synchronizer controller 122 so that both synchronizer controllers may be appropriately synchronized. Further, a configuration interface 126, labeled as SYNC_Config in FIG. 1, is provided as part of the programmable synchronizer system 100 for configuring the core clock synchronizer controller 124 so that it may be programmed for different skew tolerances, latencies and modes of operation. In one embodiment, the configuration interface 126 may be implemented as a register having a plurality of bits. In another embodiment, a memory-based setting, e.g., EPROM-stored settings, may be provided as a SYNC configuration interface.

Additional details regarding the various functional blocks and subsystems described hereinabove with respect to the bus clock synchronizer controller portion and core clock synchronizer controller portion as well as the overall programmable synchronizer system may be found in the following commonly owned patent applications: (i) "Controller Arrangement for a Programmable Clock Synchronizer," filed Jul. 30, 2003; application Ser. No. 10/630,182 (now issued as U.S. Pat. No. 7,100,065), in the name(s) of: Richard W. Adkisson; (ii) "System and Method for Synchronizing Multiple Synchronizer Controllers," filed Jul. 30, 2003; application Ser. No. 10/629,989 (now issued as U.S. Pat. No. 7,194,650), in the name(s) of: Richard W. Adkisson; (iii) "System and Method for Maintaining a Stable Synchronization State in a Programmable Clock Synchronizer," filed Jul. 30, 2003; application Ser. No. 10/630,297, in the name(s) of: Richard W. Adkisson; (iv) "System and Method for Compensating for Skew between a First Clock Signal and a Second Clock Signal," filed Jul. 30, 2003; application Ser. No. 10/630,317, in the name(s) of: Richard W. Adkisson; and (v) "Phase Detector for a Programmable Clock Synchronizer," filed Jul. 30, 2003; application Ser. No. 10/630,298 (now issued as U.S. Pat. No. 6,864,722), in the name(s) of: Richard W. Adkisson, all of which are incorporated by reference herein.

As set forth above, the synchronizer system 100 may be programmed for different skew tolerances and latencies, so that data transfer at high speeds can proceed properly even where there is a high skew or requirement of low latency. Further, the synchronizer system 100 can operate with any two clock domains having a ratio of N first clock cycles to M second clock cycles, where $N/M \geq 1$. For purposes of illustration, the operation of an embodiment of the programmable synchronizer system 100 is set forth in detail below for clock domains with a 5:4 frequency ratio.

Figure 2:
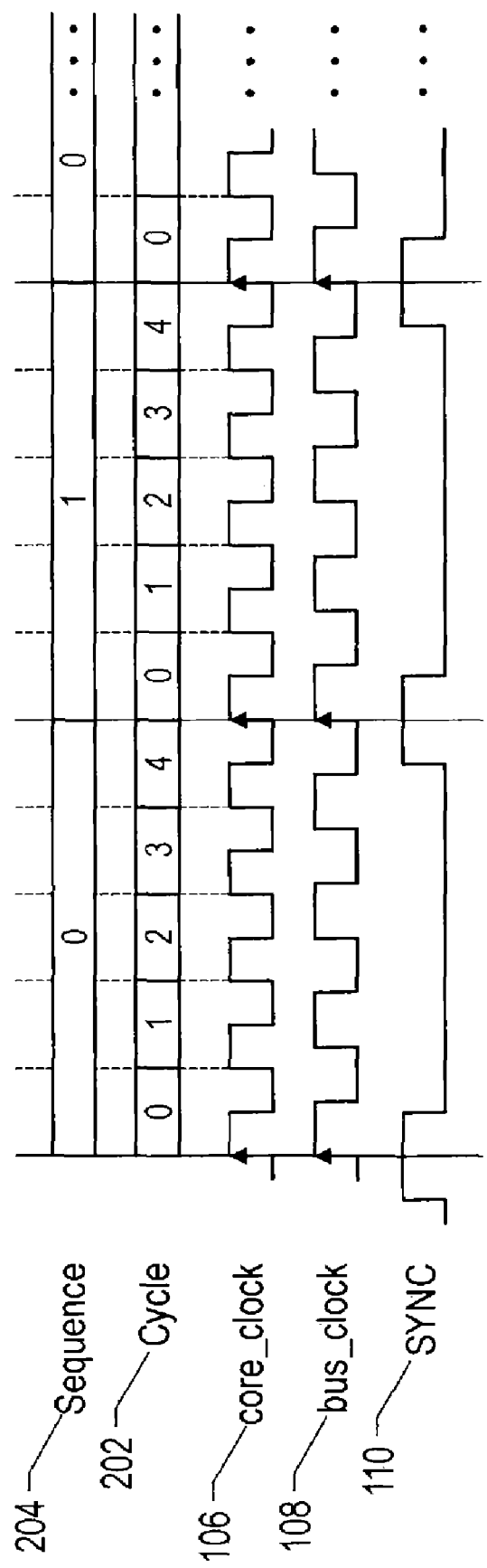
FIG. 2 depicts a timing diagram of two clock domains having a 5:4 frequency ratio wherein the programmable synchronizer system of FIG. 1 may be utilized for effectuating data transfer across the clock boundary.

Referring now to FIG. 2, depicted therein is a timing diagram 200 associated with two clock domains having a 5:4 frequency ratio. By way of example, the core_clock signal 106 is provided as the fast clock and the bus_clock signal 108 is provided as the slow clock. Accordingly, for every five ticks of the core_clock, there are four ticks of the bus_clock. As alluded to before, the SYNC pulse 110 is generated when a rising edge of the core_clock signal 106 coincides with a rising edge of the bus_clock signal 108, which commences a timing sequence window 204 for the transfer of data, that may comprise k-bit wide data ($k \geq 1$), from one clock domain to the other clock domain. A cycle count 202 refers to the numbering of core_clock cycles in a particular timing sequence 204.

As pointed above, the SYNC pulse 110 is driven HIGH on coincident rising edges of the clock signals and the data transfer operations across the clock boundary between the two clock domains are timed with reference to the SYNC pulse. In a normal condition where there is no skew (or, jitter, as it is sometimes referred to) between the clock signals, the coincident edges occur on the rising edges of the first cycle (cycle 0) as shown in FIG. 2. Since there are five core_clock cycles and only four bus_clock cycles, the first clock domain circuitry cannot transmit data during one cycle, resulting in what is known as a "dead tick," as the second clock domain circuitry does not have a corresponding time slot for receiving it. Typically, the cycle that is least skew tolerant is the one where data is not transmitted. Likewise, because of an extra cycle (where the data is indeterminate and/or invalid), the first clock domain circuitry cannot receive data during one cycle. Again, it is the cycle with the least skew tolerance during which the data is not received by the first clock domain circuitry.

Skew between the clock signals can cause, for example, a variance in the positioning of the SYNC pulse which affects the data transfer operations between the two domains. In the exemplary 5:4 frequency ratio scenario set forth above, if the bus_clock 108 leads the core_clock 106 by a quarter cycle for instance, then instead of the edges being coincident at the start of cycle 0, they will be coincident at the start of cycle 1. In similar fashion, if the bus_clock signal lags the core_clock signal by a quarter cycle, the edges will be coincident at the start of the last cycle (i.e., cycle 4). Regardless of the skew between the clock cycles, however, there will be one cycle where data cannot be sent and one cycle where data cannot be received, from the perspective of the core clock domain circuitry.

Figure 3:
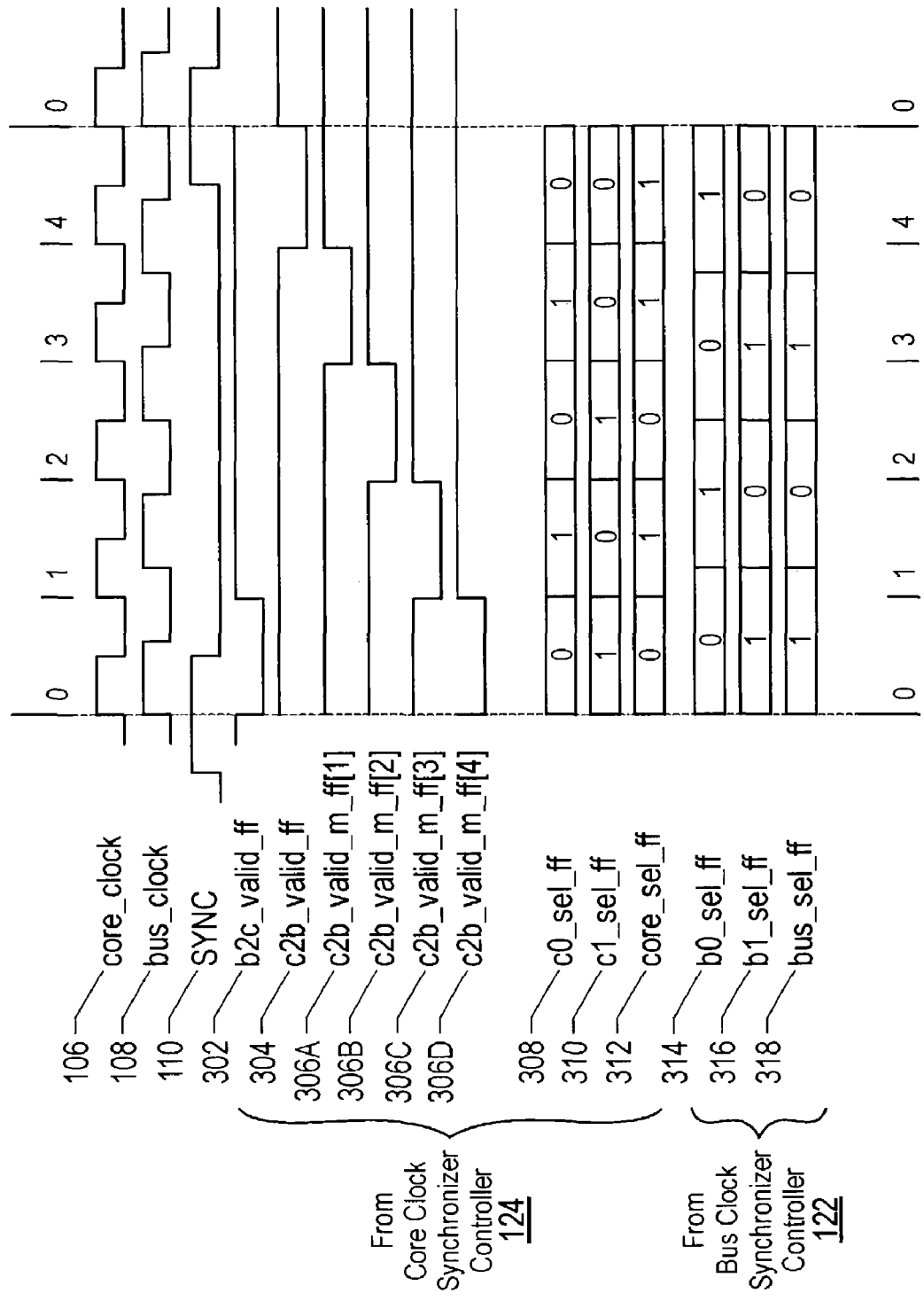
FIG. 3 depicts a timing diagram of the various control signals associated with the programmable synchronizer system for transferring data between two clock domains having a 5:4 frequency ratio.

FIG. 3 depicts a timing diagram 300 of the various control signals associated with an embodiment of the programable synchronizer system 100 for transferring data between two clock domains having 5:4 frequency ratio. The clock cycles 106, 108 and SYNC pulse 110 are depicted again for showing the temporal relationship among the control signals. Reference numeral 302 refers to a b2c_valid_ff signal (active HIGH) that is generated by the core clock synchronizer controller 124 for specifying one of the five cycles during which the core clock domain circuitry 103A cannot receive data supplied by the bus clock domain circuitry 103B. As illustrated, data may be received from the bus clock domain circuitry 103B in cycles 1–4, but not in cycle 0. Likewise, since there is a dead tick between the core and bus clocks, the core synchronizer controller 124 also provides a c2b_valid_ff signal 304 to indicate when the core clock domain circuitry 103A can validly transmit data to the bus clock domain circuitry 103B. Further a series of "advance warning" signals (each being active HIGH), c2b_valid_m_ff[4:1] 306A–306D, are provided for indicating a number of cycles ahead of time as to when the dead cycle occurs between the first and second clock signals during which the core clock domain circuitry 103A cannot transmit data. For instance, c2b_valid_ff 304 is asserted LOW in cycle 4, indicating that the core clock domain circuitry 103A cannot send data in that particular cycle. Core clock domain data during that cycle may have to be buffered accordingly before it is transmitted in a subsequent cycle. Advance warning as to the occurrence of the dead cycle may be given ahead by one cycle (i.e., in cycle 3, as indicated by c2b_valid_m_ff[1] 306A that is asserted LOW in cycle 3), by two cycles (i.e., in cycle 2, as indicated by c2b_valid m_ff[2] 306B that is asserted LOW in cycle 2), by three cycles (i.e., in cycle 1, as indicated by c2b_valid_m_ff[3] 306C that is asserted LOW in cycle 1), and by four cycles (i.e., in cycle 0, as indicated by c2b_valid m_ff[4] 306D that is asserted LOW in cycle 0))

Since the b2C_valid and c2b_valid control signals operate to indicate when a valid data transfer may occur, these signals may collectively be referred to as "transfer control" signals provided by the core clock synchronizer controller 124. The core clock synchronizer controller 124 also generates another set of control signals, namely, the synchronizer control signals (c0_sel_ff 308, c1_sel_ff 310 and core_sel_ff 312) that control the data loading and data capture circuitry of the synchronizers 105A, 105B. Likewise, the bus clock synchronizer controller 122 generates another set of synchronizer control signals (b0_sel_ff 314, b1_sel_ff 316 and bus_sel_ff 318) that also control the data loading and data capture circuitry of the synchronizers 105A, 105B, which are described below.

Figure 4A:
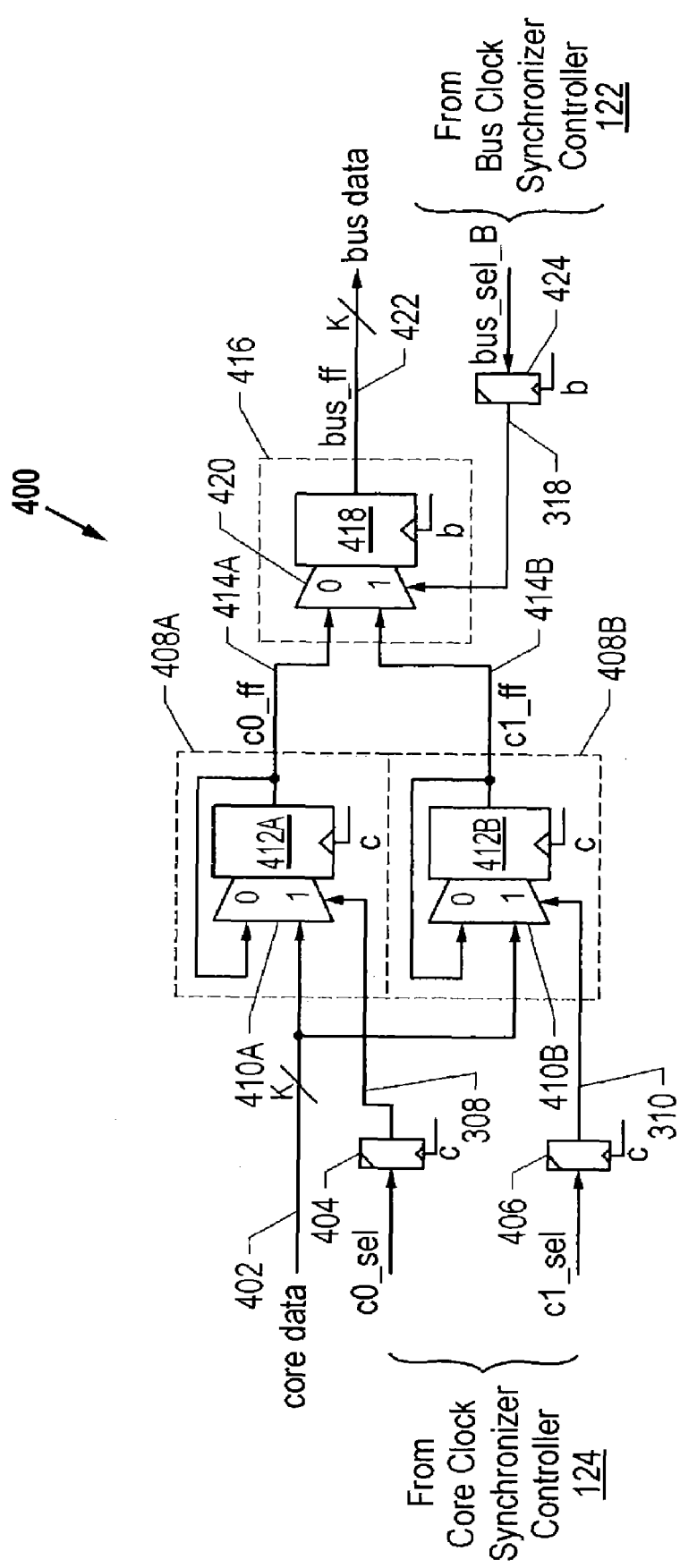
FIG. 4A depicts a block diagram of an embodiment of a synchronizer circuit for transferring data from a first clock domain (i.e., "fast clock domain" or "core clock domain") to a second clock domain (i.e., "slow clock domain" or "bus clock domain"), wherein the clock domains have a 5:4 frequency ratio.

FIG. 4A depicts a block diagram of an embodiment of a synchronizer circuit 400 for transferring data from a first clock domain to a second clock domain, wherein the clock domains have a 5:4 frequency ratio. It should be apparent that the synchronizer circuit 400 is a particular embodiment of the first synchronizer (i.e., core-to-bus synchronizer) 105A shown in FIG. 1 that is adapted to operate with the various control signals described hereinabove. Data 402 from the first clock domain (i.e., core data from the core clock domain logic) is provided on a k-bit wide data path to the input side of the synchronizer circuit 400 that essentially comprises a first TRANSMIT multiplexer-register (MUXREG) block 408A and a second TRANSMIT MUXREG block 408B. Each of the TRANSMIT MUXREG blocks includes a 2:1 MUX coupled to a register that is clocked by the first clock signal (i.e., the distributed core_clock, c 106'), wherein the k-bit wide data is provided to the input of the 2:1 MUX that is selected when a MUX control signal is driven HIGH. The other input of the 2:1 MUX is coupled via a feedback path to the output of the register associated therewith. In the embodiment shown in FIG. 4A, register 412A and associated 2:1 MUX 410A form the first TRANSMIT MUXREG block 408A, wherein the 2:1 MUX 410A is controlled by c0_sel_ff 308 (generated by the core clock synchronizer controller 124) that is staged thorough FF 404. Likewise, register 412B and associated 2:1 MUX 410B form the second TRANSMIT MUXREG block 408B, wherein the 2:1 MUX 410B is controlled by c1_sel_ff 310 (also generated by the core clock synchronizer controller 124) that is staged thorough FF 406. Each of the FF elements 404 and 406 is clocked by the distributed core_clock, c 106'.

Each of the outputs of the two TRANSMIT MUXREG blocks 408A, 408B, i.e., co_ff 414A and c1_ff 414B, respectively, is provided to a RECEIVE MUXREG block 416 on the output side of the synchronizer circuit 400, which includes a 2:1 MUX 420 and a register 418 that is clocked by the second clock signal (i.e., the distributed bus_clock, b 108'). MUX control is provided by bus_sel_B that is generated by the bus clock synchronizer controller 122 and staged through FF 424 as bus_sel_ff 318. The output of the RECEIVE MUXREG block 416 (i.e., bus_ff) is the k-bit wide data received in the bus clock domain logic as bus data 422.

Figure 4B:
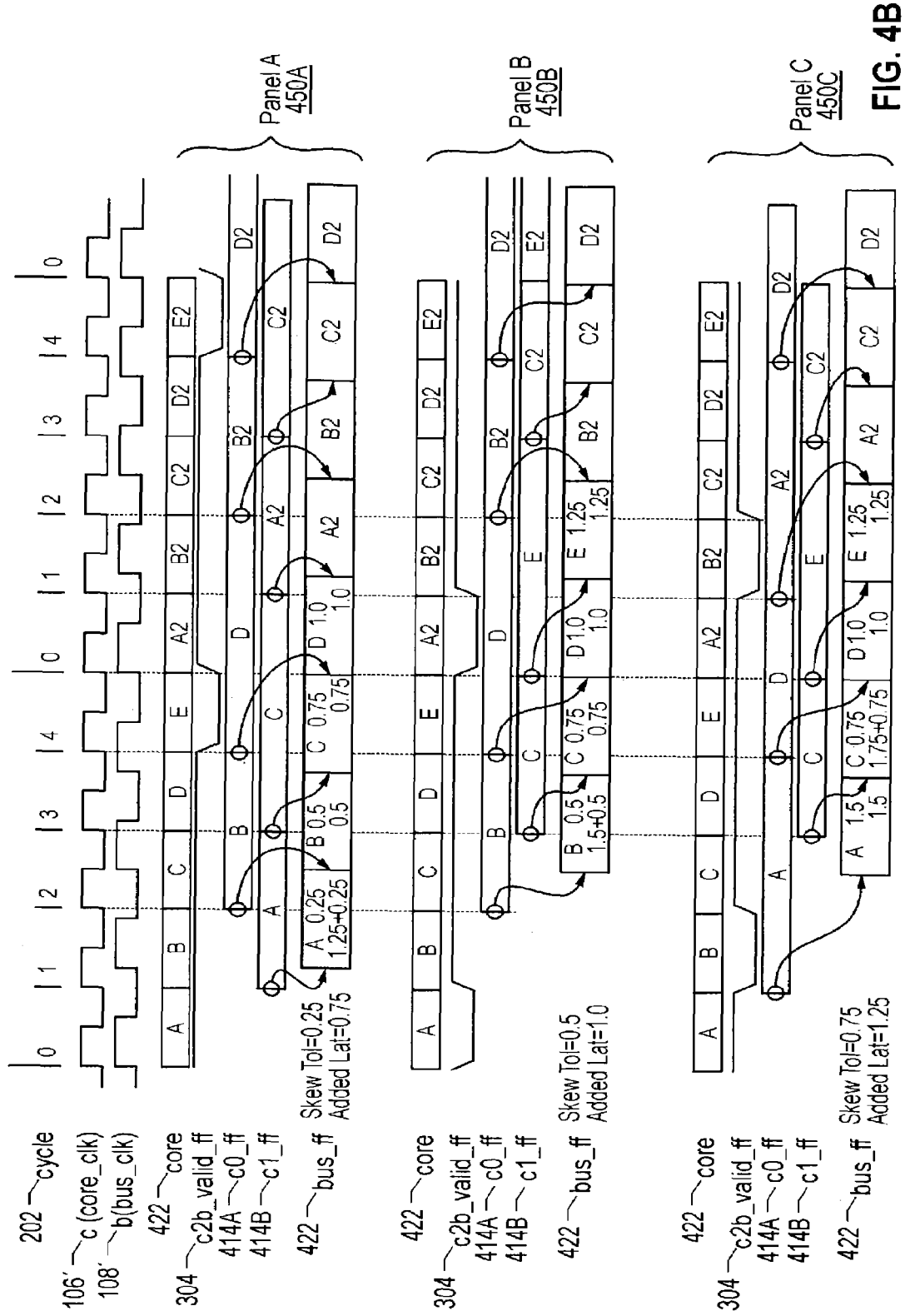
FIG. 4B depicts a timing diagram associated with the synchronizer circuit shown in FIG. 4A.

It should be apparent that although single instances of the various MUXREG blocks are shown in FIG. 4A, there are in fact k such blocks in the data path through the core-to-bus synchronizer 400 to synchronize the transfer of all k data signals (of the k-bit wide data, k≧1) from the core clock domain logic to the bus clock domain logic. FIG. 4B depicts a timing diagram associated with the core-to-bus synchronizer embodiment 400 which illustrates the temporal relationship of the various control signals associated therewith and the effect of different skew tolerances and latencies. Two sequences of core data 402, [A,B,C,D,E] and [A2,B2,C2, D2,E2], are exemplified, each data block being k-bit wide and available for a particular clock cycle, 0 through 4. Different skew tolerances and latency factors may be programmed by controlling what the RECEIVE MUXREG block 416 loads from c0_ff 414A or c1_ff 414B. In Panel A 450A, data transfer from the core domain circuitry to the bus domain circuitry is shown where a condition involving skew tolerance of 0.25 (of a core_clock period) and added latency of 0.75 (of a core_clock period) is programmed. Under these conditions, the core clock synchronizer controller 124 generates the c2b_valid_ff 304 signal such that there is no valid TX operation on cycle 4 (i.e., the fifth cycle). Accordingly, the TRANSMIT MUXREG blocks 408A and 408B respectively load the data portions [B,D] and [A,C] in each sequence, as controlled by c0_sel_ff 308 and c1_sel_ff 310. The data portion in cycle 4, [E], is not sent, which may be buffered and/or transmitted subsequently on a separate data path. The RECEIVE MUXREG block 416 alternatively loads from c0_ff 414A (for the [B,D] portion) and c1_ff 414B (for the [A,C] portion) under the control of bus_sel_B 318 from the bus clock synchronizer controller 122. The data from the RECEIVE MUXREG block 416 is clocked out using the distributed bus_clock, b 108', as bus_ff 422 (i.e., bus data), the sequences being [A,B,C,D] and [A2,B2,C2, D2].

Likewise, in Panels 450B and 450C, data transfers involving skew tolerance of 0.5 and added latency of 1.0 and skew tolerance of 0.75 and added latency of 1.25 are respectively shown. Under these conditions, the core clock synchronizer controller 124 determines that data transmit operations in cycle 0 and cycle 1, respectively, are invalid. Accordingly, c2b_valid_ff 304 signals that are asserted LOW in cycle 0 and in cycle 1 are provided by the core clock synchronizer controller to indicate that data portion [A] and data portion [B] cannot be transmitted. As a result, the transmitted bus data sequences are [B,C,D,E]/[B2,C2,D2,E2] and [A,C,D, E]/[A2,C2,D2,E2], respectively, under the two sets of skew/latency combinations illustrated.

Figure 5A:
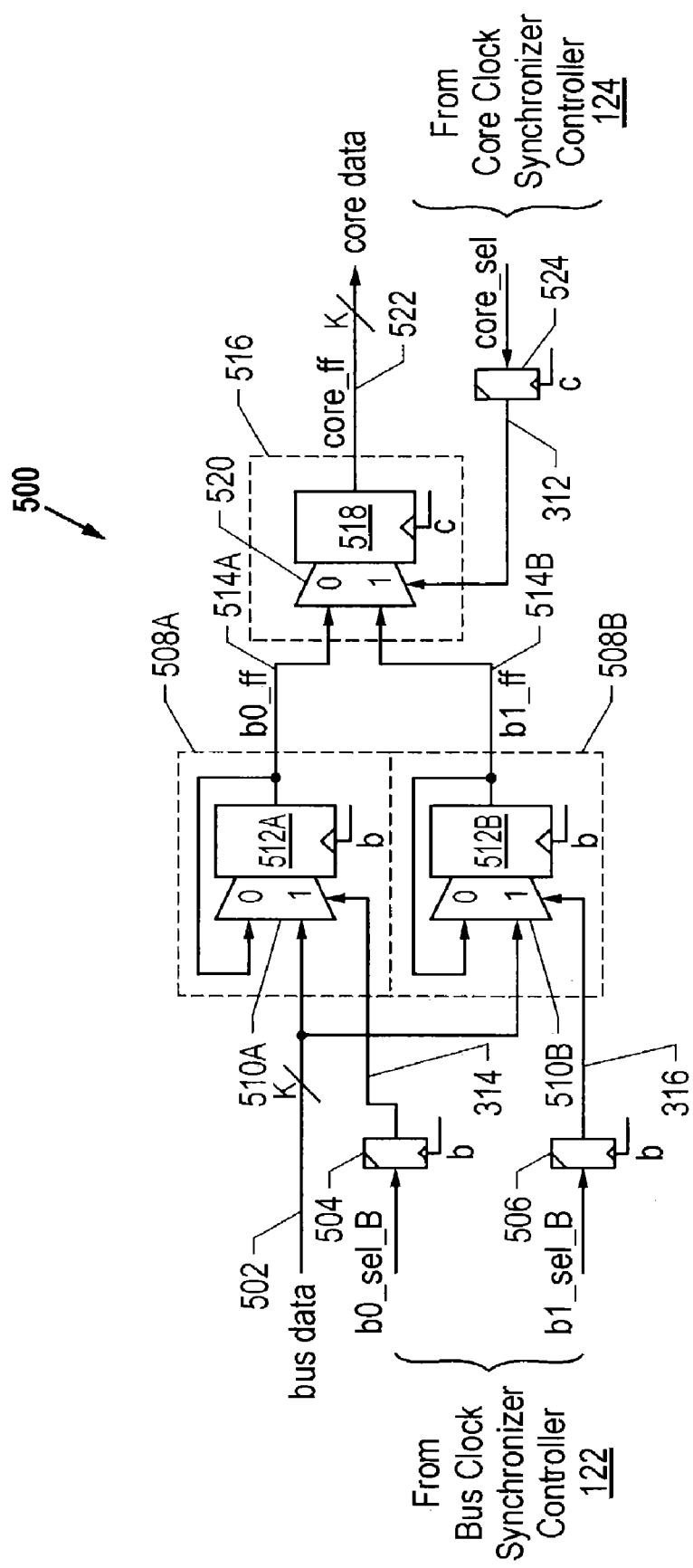
FIG. 5A depicts a block diagram of an embodiment of a synchronizer circuit for transferring data from the second clock domain (i.e., "slow clock domain" or "bus clock domain") to the first clock domain (i.e., "fast clock domain" or "core clock domain"), wherein the clock domains have a 5:4 frequency ratio.

Referring now to FIG. 5A, depicted therein is a block diagram of an embodiment of a synchronizer circuit 500 for transferring data from a bus clock domain to a core clock domain, wherein the core and bus clock domains have a 5:4 frequency ratio. Again, those skilled in the art will recognize that the synchronizer circuit 500 is a particular embodiment of the second synchronizer (i.e., bus-to-core synchronizer) 105B shown in FIG. 1 that is adapted to operate with the various control signals described hereinabove with particular reference to FIG. 3. Further, it should be apparent that the physical circuitry of the bus-to-core synchronizer 500 is essentially similar to that of the core-to-bus synchronizer 400 set forth in detail above, but for being wired with different control signals, appropriately generated by the synchronizer controllers.

Data 502 from the second clock domain (i.e., bus data from the bus clock domain logic) is provided on a k-bit wide data path to the input side of the synchronizer circuit 500 that comprises a pair of TRANSMIT MUXREG blocks 508A, 508B disposed in the bus clock domain. Each of the TRANSMIT MUXREG blocks includes a 2:1 MUX coupled to a register that is clocked by the second clock signal (i.e., the distributed bus_clock, b 108'), wherein the k-bit wide bus data 502 is provided to the input of the 2:1 MUX that is selected when a MUX control signal is driven HIGH. The other input of the 2:1 MUX is coupled via a feedback path to the output of the register associated therewith. In the embodiment shown in FIG. 5A, register 512A and associated 2:1 MUX 510A form the first TRANSMIT MUXREG block 508A disposed in the second clock domain, wherein the 2:1 MUX 510A is controlled by b0_sel_B (generated by the bus clock synchronizer controller 122) that is staged thorough FF 504 as b0_sel_ff 314. Likewise, register 512B and associated 2:1 MUX 510B form the second TRANSMIT MUXREG block 508B disposed in the second clock domain, wherein the 2:1 MUX 510B is controlled by b1_sel_B (also generated by the bus clock synchronizer controller 122) that is staged thorough FF 506 as b1_sel_ff 316. Each FF 504, 506 is clocked by the distributed bus_clock, b 108'.

The outputs of the two TRANSMIT MUXREG blocks 508A, 508B, i.e., b0_ff 514A and b1_ff 514B, respectively, are provided to a RECEIVE MUXREG block 516 on the output side of the synchronizer circuit 500 (i.e., disposed in the first clock domain), which includes a 2:1 MUX 520 and a register 518 that is clocked by the first clock signal (i.e., the distributed core_clock, c 106'). MUX control is provided by core_sel that is generated by the core clock synchronizer controller 124 and staged through FF 524 as core_sel_ff 312. The output of the RECEIVE MUXREG block 516 (i.e., core_ff) is the k-bit wide data received in the core clock domain logic as core data 522.

Figure 5B:
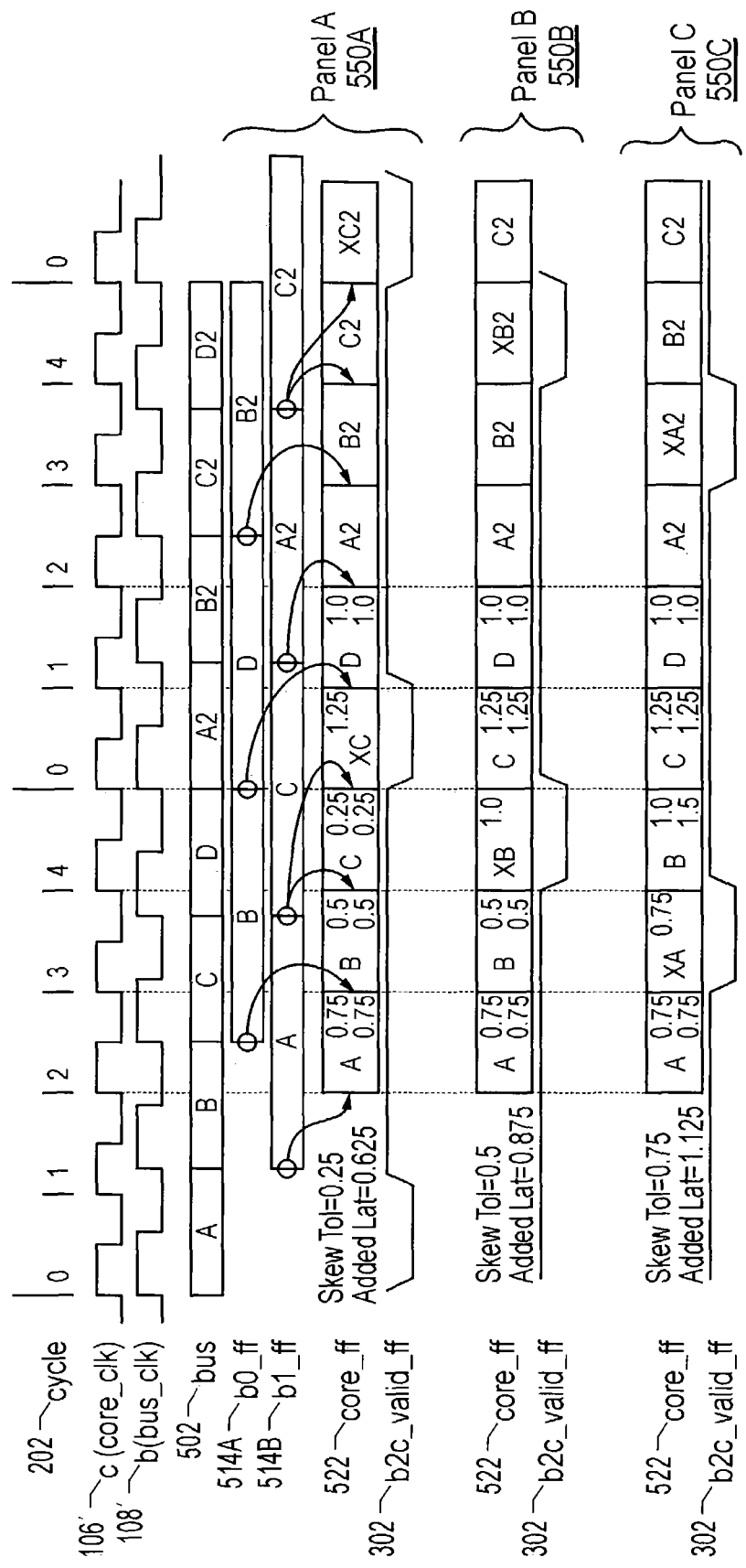
FIG. 5B depicts a timing diagram associated with the synchronizer circuit shown in FIG. 4B.

Again, it will be recognized that in actual implementation, the synchronizer embodiment 500 shown in FIG. 5A may include multiple instances of the various MUXREG blocks to synchronize the transfer of all k data signals (of the k-bit wide bus data, k≧1) from the bus clock domain logic to the core clock domain logic. FIG. 5B depicts a timing diagram associated with the bus-to-core synchronizer embodiment 500 which illustrates the temporal relationship of the various control signals associated therewith and the effect of different skew tolerances and latencies. Two sequences of bus data 502, [A,B,C,D] and [A2,B2,C2,D2], are exemplified, each block being k-bit wide and available for a particular clock cycle, 0 through 3. Different skew tolerances and latency factors may be programmed by controlling when the RECEIVE MUXREG block 516 loads from b0_ff 514A or b1_ff 514B. In 5:4 mode, for example, the RECEIVE MUXREG block 516 loads five times but since only four data transfers can come from the bus domain, only four will be used (the extra cycle having an unused data portion, marked with an X in the Panels 550A–550C). As shown in FIG. 5B, bus data 502 is stored in the TRANSMIT MUXREG blocks where each loads alternatively, under the control of b0_sel_B 314 and b1_sel_B 316, on every other bus_clock. Also, each TRANSMIT MUXREG block holds the data for two bus clocks. Accordingly, the first data block [A] is stored in TRANSMIT MUXREG 512B, the second data block [B] in TRANSMIT MUXREG 512A, the third data block [C] in TRANSMIT MUXREG 512B, and finally, the fourth data block [D] in TRANSMIT MUXREG 512A. The output of the two TRANSMIT MUXREG block 512A and 512B, therefore, comprises, data portions [B,D] as b0_ff 514A and [A,C] as b1_ff 514B.

In Panel A 550A, data transfer from the bus domain circuitry to the core domain circuitry is shown where a condition involving skew tolerance of 0.25 and added latency of 0.625 is programmed. Skew tolerance, which is measured in core clock cycles in this case, is defined as the minimum distance between data sample (i.e., core_ff) and changing data input (i.e., b0_ff or b1_ff). Added latency is also measured in core clock cycles, obtained by averaging the values associated with the four data blocks (from start of data input, i.e., b0_ff or b1_ff to core_ff). Actual latency is determined as one bus clock cycle plus the added latency, which in 5:4 mode translates to 1.25 core_clock cycles plus the added latency.

As shown in Panel A 550A, which exemplifies the best latency condition but with the worst skew tolerance, the core clock synchronizer controller 124 generates the b2c_valid_ff 302 signal such that there is no valid RX operation on cycle 0 of the core_clock (i.e., its first cycle). The output of the RECEIVE MUXREG 516, i.e., core_ff 522, first loads data block [A] from b1_ff 514B, then data block [B] from b0_ff 514A, then data block [C] from b1_ff 514B, and then data block [C] again (in cycle 0 of the core_clock's second sequence, which is the extra cycle unused, hence giving rise to the invalid C or XC data block), and finally, data block [D] from b0_ff 514A. Since the valid [C] block was loaded into core_ff 522 from b1_ff 514B 0.25 core_clock cycles after b1_ff 514B loaded it, the skew tolerance is 0.25 core_clock cycles.

Panel B 550B of FIG. 5B exemplifies the programming mode with the next best latency condition (added latency=0.875) which has the next best skew tolerance (=0.5 core_clock cycles). Under these conditions, the core clock synchronizer controller 124 generates b2c_valid_ff 302 such that it is driven LOW in the fifth core_clock cycle (i.e., cycle 4). The output of the RECEIVE MUXREG 516, i.e., core_ff 522, first loads data block [A] from b1_ff 514B, then data block [B] from b0_ff 514A, and again data block [B] that is not used (in cycle 4 of the core_clock's first sequence, which is the extra cycle unused, hence giving rise to, the invalid B or XB data block), then data block [C] from b1_ff 514B,and finally, data block {D] from b0_ff 514A. Since the valid [B] block was loaded into core ff 522 from b0_ff 514A 0.5 core_clock cycles after it appeared on b0_ff 514A, the skew tolerance is 0.5 core_clock cycles.

The programming mode with the worst latency (=1.125) and the best skew tolerance (=0.75 of core_clock cycles) is shown in Panel C 550C of FIG. 5B. The core clock synchronizer controller 124 generates b2c_valid_ff 302 such that it is driven LOW in the fourth core_clock cycle (i.e., cycle 3). The output of the RECEIVE MUXREG 516, i.e., core_ff 522, first loads data block [A] from b1_ff 514B (in cycle 2 of the core_clock's first sequence), and again data block [A] that is not used (in cycle 3 of the core_clock's first sequence, which is the extra cycle unused, hence giving rise to the invalid A or XA data block), and then data block [B] from b0_ff 514A, then data block [C] from b1_ff 514B, and finally, data block [D] from b0_ff 514A. Since the valid [A] block was loaded into core_ff 522 from b1_ff 514A 0.75 core_clock cycles after it appeared on b1_ff 514A, the skew tolerance is 0.75 core_clock cycles. As pointed out earlier, the added latency is the average of the time (in core_clock cycles) from b0_ff or b1_ff to core_ff for all used data. Accordingly, no latency value is shown in any data portion with an X.

Based on the foregoing Detailed Description, it should be appreciated that the synchronizer embodiments of the present invention may be programmed for different latencies and skew tolerances for transferring data across a clock boundary between any two clock domains having a known N:M ratio (e.g., M=N−1). Since the physical implementation of the synchronizer circuitry in both directions of data transfer is essentially the same, a single design may be used for a particular application, thereby minimizing development costs.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A programmable synchronizer system for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where N/M≧1, comprising:

a first synchronizer controller circuit operating in said first clock domain responsive to a SYNC pulse that is sampled in said first clock domain;

a configuration interface for configuring said first synchronizer controller circuit to compensate for at least one of a variable skew factor and a variable latency factor associated with said first clock signal; and a second synchronizer controller circuit operating in said second clock domain responsive to said SYNC pulse that is sampled in said second clock domain, said second synchronizer controller circuit operating to generate a plurality of inter-controller control signals towards said first synchronizer controller circuit, wherein each of said first and second synchronizer controller circuits generates a set of synchronizer control signals, a portion of which signals are provided to a first synchronizer operating to control data transfer from said first circuitry to said second circuitry and a portion of which signals are provided to a second synchronizer operating to control data transfer from said second circuitry to said first circuitry.

2. The programmable synchronizer system as recited in claim 1, wherein said SYNC pulse is generated by a phase-locked loop (PLL) when a rising edge in said first clock signal is coincident with a rising edge in said second clock signal.

3. The programmable synchronizer system as recited in claim 1, wherein said first synchronizer comprises:

a first TRANSMIT multiplex-register MUXREG block disposed in said first clock domain, said first TRANSMIT MUXREG block operating to transmit a portion of data responsive to a c0_sel control signal that is registered using said first clock signal, wherein said data is generated in said first clock domain by said first circuitry and c0_sel control signal generated by said first synchronizer controller;

a second TRANSMIT MUXREG block in said first clock domain for transmitting another portion of said data generated in said first clock domain responsive to a c1_sel control signal that is registered using said first clock signal, wherein said c1_sel control signal is generated by said first synchronizer controller; and a RECEIVE MUXREG block disposed in said second clock domain for receiving said data from said first and second TRANSMIT MUXREG blocks in a serial fashion responsive to a bus_sel control signal that is registered using said second clock signal, wherein said bus_sel control is generated by said second synchronizer controller.

4. The programmable synchronizer system as recited in claim 3, wherein said first TRANSMIT MUXREG block includes a 2:1 MUX that is controlled by said c0_sel control signal.

5. The programmable synchronizer system as recited in claim 3, wherein said second TRANSMIT MUXREG block includes a 2:1 MUM that is controlled by said c1_sel control signal.

6. The programmable synchronizer system as recited in claim 3, wherein said RECEIVE MUXREG block includes a 2:1 MUX that is controlled by said bus_sel control signal.

7. The programmable synchronizer system as recited in claim 3, wherein said data comprises k-bit wide data and said first synchronizer includes k instances of each of said first and second TRANSMIT MUXREG blocks and said RECEIVE MUXREG block.

8. The programmable synchronizer system as recited in claim 1, wherein said second synchronizer comprises:

a first TRANSMIT multiplex-register (MUXREG) block disposed in said second clock domain, said first TRANSMIT MUXREG block operating to transmit a portion of data responsive to a b0_sel control signal that is registered using said second clock signal, wherein said data is generated in said second clock domain by said second circuitry and said b0_sel control signal is generated by said second synchronizer controller;

a second TRANSMIT MUXREG block in said second clock domain for transmitting another portion of said data generated in said second clock domain responsive to a b1_sel control signal that is registered using said second clock signal, wherein said b1_sel control signal is generated by said second synchronizer controller; and a RECEIVE MUXREG block disposed in said first clock domain for receiving said data from said first and second TRANSMIT MUXREG blocks in a serial fashion responsive to a core_sel control signal that is registered using said first clock signal.

9. The programmable synchronizer system as recited in claim 8, wherein said first TRANSMIT MUXREG block includes a 2:1 MUX that is controlled by said b0_sel control signal.

10. The programmable synchronizer system as recited in claim 8, wherein said second TRANSMIT MUXREG block includes a 2:1 MUX that is controlled by said b1_sel control signal.

11. The programmable synchronizer system as recited in claim 8, wherein said RECEIVE MUXREG block includes a 2:1 MUX that is controlled by said core_sel control signal.

12. The programmable synchronizer system as recited in claim 8, wherein said data comprises k-bit wide data and said second synchronizer includes k instances of each of said first and second TRANSMIT MUXREG blocks and said RECEIVE MUXREG block.

13. A programmable synchronizer system for effectuating data transfer across a clock boundary between a core clock domain and a bus clock domain, wherein said core clock domain is operable with a core clock signal and said bus clock domain is operable with a bus clock signal, said core and bus clock signals having a ratio of N core clock cycles to M bus clock cycles, where $N/M \geq 1$, comprising:

first circuit means for synchronizing data transfer from a core clock domain logic block to a bus clock domain logic block;

second circuit means for synchronizing data transfer from said bus clock domain logic block to said core clock domain logic block; and control means for controlling said first and second circuit means, said control means operating responsive at least in part to configuration means that is programmably configurable based on at least one of skew and latency associated with said core clock signal.

14. The programmable synchronizer system for effectuating data transfer across a clock boundary between a core clock domain and a bus clock domain as recited in claim 13, wherein said first circuit means comprises a core-to-bus synchronizer operable to transfer data from a core clock domain to a bus clock domain, said core clock and bus clock signals having a ratio of 5 core clock cycles to 4 bus clock cycles.

15. The programmable synchronizer system for effectuating data transfer across a clock boundary between a core clock domain and a bus clock domain, as recited in claim 13, wherein said second circuit means comprises a bus-to-core synchronizer operable to transfer data from a bus clock domain to a core clock domain, said core clock and bus clock signals having a ratio of 5 core clock cycles to 4 bus clock cycles.

16. The programmable synchronizer system for effectuating data transfer across a clock boundary between a core clock domain and a bus clock domain as recited in claim 13, further including detector means for detecting a phase difference between said core clock and bus clock signals, said detector means operating to generate a control signal directed to said first circuit means.

17. A computer system having a programmable synchronizer apparatus for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where $N/M \geq 1$, comprising:

a first synchronizer controller circuit operating in said first clock domain responsive to a SYNC pulse that is sampled in said first clock domain;

a configuration interface for configuring said first synchronizer controller circuit to compensate for at least one of a variable skew factor and a variable latency factor associated with said first clock signal; and a second synchronizer controller circuit operating in said second clock domain responsive to said SYNC pulse that is sampled in said second clock domain, said second synchronizer controller circuit operating to generate a plurality of inter-controller control signals towards said first synchronizer controller circuit, wherein each of said first and second synchronizer controller circuits generates a set of synchronizer control signals, a portion of which signals are provided to a first synchronizer operating with respect to data transfer from said first circuitry to said second circuitry and a portion of which signals are provided to a second synchronizer operating with respect to data transfer from said second circuitry to said first circuitry.

18. The computer system as recited in claim 17, wherein said SYNC pulse is generated by a phaselocked loop (PLL) responsive to a rising edge in said first clock signal that is coincident with a rising edge in said second clock signal.

19. The computer system as recited in claim 17, wherein said first synchronizer comprises:

a first TRANSMIT multiplex-register (MUXREG) block disposed in said first clock domain, said first TRANSMIT MUXREG block operating to transmit a portion of data responsive to a c0_sel control signal that is registered using said first clock signal, wherein said data is generated in said first clock domain by said first circuitry and said c0_sel control signal generated by said first synchronizer controller;

a second TRANSMIT MUXREG block in said first clock domain for transmitting another portion of said data generated in said first clock domain responsive to a c1_sel control signal that is registered using said first clock signal, wherein said c1_sel control signal is generated by said first synchronizer controller; and a RECEIVE MUXREG block disposed in said second clock domain for receiving said data from said first and second TRANSMIT MUXREG blocks in a serial fashion responsive to a bus_sel control signal that is registered using said second clock signal, wherein said bus_sel control is generated by said second synchronizer controller.

20. The computer system as recited in claim 19, wherein said first TRANSMIT MUXREG block includes a 2:1 MUX that is controlled by said c0_sel control signal.

21. The computer system as recited in claim 19, wherein said second TRANSMIT MUXRE3G block includes a 2:1 MUX that is controlled by said c1_sel control signal.

22. The computer system as recited in claim 19, wherein said RECEIVE MUXREG block includes a 2:1 MUX that is controlled by said bus_sel control signal.

23. The computer system as recited in claim 19, wherein said data comprises k-bit wide data and said first synchronizer includes k instances of each of said first and second TRANSMIT MUXREG blocks and said RECEIVE MUXREG block.

24. The computer system as recited in claim 17, wherein said second synchronizer comprises:

a first TRANSMIT multiplex-register (MUXREG) block disposed in said second clock domain, said first TRANSMIT MUXREG block operating to transmit a portion of data responsive to a b0_sel control signal that is registered using said second clock signal, wherein said data is generated in said second clock domain by said second circuitry and said b0_sel control signal is generated by said second synchronizer controller ;

a second TRANSMIT MUXREG block in said second clock domain for transmitting another portion of said data generated in said second clock domain responsive to a b1_sel control signal that is registered using said second clock signal, wherein said b1_sel control signal is generated by said second synchronizer controller; and a RECEIVE MUXREG block disposed in said first clock domain for receiving said data from said first and second TRANSMIT MUXREG blocks in a serial fashion responsive to a core_sel control signal that is registered using said first clock signal.

25. The computer system as recited in claim 24, wherein said first TRANSMIT MUXREG block includes a 2:1 MUX that is controlled by said b0_sel control signal.

26. The computer system as recited in claim 24, wherein said second TRANSMIT MUXREG block includes a 2:1 MUX that is controlled by said b1_sel control signal.

27. The computer system as recited in claim 24, wherein said RECEIVE MUXREG block includes a 2:1 MUX that is controlled by said core_sel control signal.

28. The computer system as recited in claim 24, wherein said data comprises k-bit wide data and said second synchronizer includes k instances of each of said first and second TRANSMIT MUXREG blocks and said RECEIVE MUXREG block.

29. The computer system as recited in claim 17, wherein said first synchronizer is operable to transfer data from a core clock domain that is clocked by a core clock signal operating as said first clock signal to a bus clock domain that is clocked by a bus clock signal operating as said second clock signal, said core clock and bus clock signals having a ratio of 5 core clock cycles to 4 bus clock cycles.

30. The computer system as recited in claim 17, wherein said second synchronizer is operable to transfer data from a bus clock domain that is clocked by a bus clock signal operating as said second clock signal to a core clock domain that is clocked by a core clock signal as operating said first clock signal, said core clock and bus clock signals having a ratio of 5 core clock cycles to 4 bus clock cycles.

31. A programmable synchronizer system for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where $N/M \geq 1$, comprising:

a first synchronizer controller circuit operating in said first clock domain responsive to a SYNC pulse that is sampled in said first clock domain;

a configuration interface for configuring said first synchronizer controller circuit to compensate for at least one of a variable skew factor and a variable latency factor associated with said first clock signal; and a second synchronizer controller circuit operating in said second clock domain responsive to said SYNC pulse that is sampled in said second clock domain and a plurality of inter-controller control signals generated by said first synchronizer controller circuit towards said second synchronizer controller circuit, wherein each of said first and second synchronizer controller circuits generates a set of synchronizer control signals, a portion of which signals are provided to a first synchronizer operating to control data transfer from said first circuitry to said second circuitry and a portion of which signals are provided to a second synchronizer operating to control data transfer from said second circuitry to said first circuitry.

32. The programmable synchronizer system as recited in claim 31, wherein said SYNC pulse is generated by a phaselocked loop (PLL) when a rising edge in said first clock signal is coincident with a rising edge in said second clock signal.

33. The programmable synchronizer system as recited in claim 31, further including detector means for detecting a phase difference between said first clock and second clock signals, said detector means operating to generate a phase detection control signal directed to said first synchronizer controller circuit.

* * * * *

UNITED STATES PATENT AND TRADEMARK OFFICE
CERTIFICATE OF CORRECTION

PATENT NO.      : 7,219,251 B2                                   Page 1 of 1
APPLICATION NO. : 10/630159
DATED           : May 15, 2007
INVENTOR(S)     : Richard W. Adkisson It is certified that error appears in the above-identified patent and that said Letters Patent is hereby corrected as shown below:

In column 1, lines 19-20, delete "following commonly owned patent applications:" before "(i)".

In column 11, line 56, in Claim 3, delete "MUXREG" and insert -- (MUXREG) --, therefor.

In column 12, line 16, in Claim 5, delete "MUM" and insert -- MUX --, therefor.

In column 13, line 27, in Claim 15, after "domain" delete ",".

In column 14, line 4, in Claim 18, delete "phaselocked" and insert -- phase-locked --, therefor.

In column 14, line 34, in Claim 21, delete "MUXRE3G" and insert -- MUXREG --, therefor.

In column 15, line 8, in Claim 27, delete "RECEVE" and insert -- RECEIVE --, therefor.

In column 16, line 26, in Claim 32, delete "phaselocked" and insert -- phase-locked --, therefor.

Signed and Sealed this

Twenty-sixth Day of August, 2008

JON W. DUDAS
*Director of the United States Patent and Trademark Office*